United States Patent
Schenk

(10) Patent No.: US 10,076,791 B2
(45) Date of Patent: Sep. 18, 2018

(54) PRECISION CLAMPING SYSTEM

(71) Applicant: Roehm GmbH, Sontheim/Brenz (DE)

(72) Inventor: Peter Schenk, Niederstotzingen (DE)

(73) Assignee: Roehm GmbH, Sontheim/Brenz (DE)

( * ) Notice: Subject to any disclaimer, the term of this patent is extended or adjusted under 35 U.S.C. 154(b) by 102 days.

(21) Appl. No.: 15/136,129

(22) Filed: Apr. 22, 2016

(65) Prior Publication Data

US 2016/0311032 A1    Oct. 27, 2016

(30) Foreign Application Priority Data

Apr. 22, 2015   (DE) .................. 10 2015 106 162

(51) Int. Cl.
*B23B 31/20*    (2006.01)
*B23Q 3/12*    (2006.01)
*B23B 31/107*    (2006.01)
*B25F 3/00*    (2006.01)

(52) U.S. Cl.
CPC .......... *B23B 31/20* (2013.01); *B23B 31/1071* (2013.01); *B23Q 3/12* (2013.01); *B25F 3/00* (2013.01); *B23B 2231/04* (2013.01); *B23B 2231/2008* (2013.01); *B23B 2231/2024* (2013.01); *B23B 2231/2083* (2013.01); *Y10T 279/17529* (2015.01); *Y10T 279/3406* (2015.01); *Y10T 279/3412* (2015.01); *Y10T 408/95* (2015.01)

(58) Field of Classification Search
CPC ........ B23B 2231/04; B23B 2231/2083; B23B 31/20; B23B 31/1071; Y10T 279/17529; Y10T 279/3406; Y10T 279/3412
See application file for complete search history.

(56) References Cited

U.S. PATENT DOCUMENTS

| | | | | |
|---|---|---|---|---|
| 2,491,605 A | * | 12/1949 | Chittenden | ......... B23B 31/1071 |
| | | | | 279/47 |
| 2,719,047 A | * | 9/1955 | Bayes | ....................... B60S 1/34 |
| | | | | 279/46.5 |
| 7,328,903 B2 | | 2/2008 | Casel | |

(Continued)

FOREIGN PATENT DOCUMENTS

| DE | 1 735 423 U | 12/1956 |
|---|---|---|
| DE | 36 05 970 C2 | 9/1994 |

(Continued)

*Primary Examiner* — Eric A Gates

(74) *Attorney, Agent, or Firm* — Muncy, Geissler, Olds & Lowe, P.C.

(57) ABSTRACT

A precision clamping system having a collet having a tool receptacle and which includes a chuck body formed from a single part, on whose first end a connecting piece is formed, which is directly connectable to a machine spindle of a drilling machine, and on whose second end facing away from the first end a collet receptacle is formed for receiving the collet. The connecting piece is designed in such a way that a form-fitting connection to the machine spindle is established for positive rotary entrainment of the chuck body, the collet receptacle has a conical design, and the collet is assigned a collet thread which may be screwed to a thread formed on the second end of the chuck body. A combination of a drilling machine having a precision clamping system and a system including a precision clamping system having multiple collets is also provided.

13 Claims, 3 Drawing Sheets

(56) References Cited

U.S. PATENT DOCUMENTS

| | | | | |
|---|---|---|---|---|
| 7,334,970 B2* | 2/2008 | Kozak | ............... | B23B 31/005 |
| | | | | 279/137 |
| 7,549,953 B2* | 6/2009 | Walters | ............... | B23B 31/20 |
| | | | | 279/143 |
| 7,997,837 B2* | 8/2011 | Furusawa | ............... | B23Q 3/12 |
| | | | | 279/144 |
| 8,132,990 B2* | 3/2012 | Bauman | ............... | B23B 31/008 |
| | | | | 279/137 |
| 8,844,939 B2* | 9/2014 | Woecht | ............... | B25F 3/00 |
| | | | | 279/140 |
| 9,004,498 B2* | 4/2015 | Haimer | ............... | B23B 31/201 |
| | | | | 279/42 |
| 9,579,782 B2* | 2/2017 | Tussing | ............... | B25F 3/00 |
| 9,586,268 B2* | 3/2017 | McCluskey | ............... | B23B 31/207 |
| 9,751,176 B2* | 9/2017 | McRoberts | ............... | B23Q 5/045 |
| 2003/0178797 A1* | 9/2003 | Lovchik | ............... | B23B 31/1071 |
| | | | | 279/75 |
| 2007/0290458 A1* | 12/2007 | Chuang | ............... | B25F 3/00 |
| | | | | 279/143 |
| 2010/0096814 A1* | 4/2010 | Chen | ............... | B23B 31/02 |
| | | | | 279/48 |
| 2013/0077137 A1 | 3/2013 | Nishikawa | | |
| 2013/0093142 A1* | 4/2013 | Saur | ............... | B23B 31/02 |
| | | | | 279/44 |
| 2013/0161044 A1* | 6/2013 | Hecht | ............... | B23B 31/1238 |
| | | | | 173/90 |
| 2014/0276206 A1* | 9/2014 | Woodward | ............... | A61B 10/025 |
| | | | | 600/567 |
| 2015/0115549 A1* | 4/2015 | Teusch | ............... | B23B 31/305 |
| | | | | 279/4.06 |
| 2015/0343583 A1* | 12/2015 | McRoberts | ............... | B23Q 5/045 |
| | | | | 173/213 |

FOREIGN PATENT DOCUMENTS

| | | |
|---|---|---|
| DE | 20 2008 009 208 U1 | 10/2006 |
| DE | 10 2004 003 778 B4 | 1/2008 |
| DE | 101 51 582 B4 | 11/2013 |
| EP | 2 292 358 A2 | 3/2011 |

\* cited by examiner

PRECISION CLAMPING SYSTEM

This nonprovisional application claims priority under 35 U.S.C. § 119(a) to German Patent Application No. 10 2015 106 162.7, which was filed in Germany on Apr. 22, 2015, and which is herein incorporated by reference.

BACKGROUND OF THE INVENTION

Field of the Invention

The invention relates to a precision clamping system, which includes a collet having a tool receptacle and which includes a chuck body formed from a single part, on whose first end a connecting piece is formed, which is directly connectable to a machine spindle of a drilling machine, and on whose second end facing away from the first end a collet receptacle is formed for receiving the collet. The invention furthermore relates to a combination of a drilling machine with a precision clamping system and a system comprising a precision clamping system.

Description of the Background Art

A clamping system designed as a quick-change chuck of the type mentioned at the outset is described in DE 1 735 423 U, which provides a tool carrier having a collet for preventing the clamped tool from sliding out. The chuck body is mounted in a frictionally engaged manner on a conical machine spindle, for which purpose a conical receptacle is formed in the chuck body on the side facing the machine spindle. The rotational movement of the chuck body is transmitted to a tool carrier on the side facing away from the machine spindle with the aid of driving balls, the tool carrier, in turn, being able to rotatably fixedly receive the tool to be clamped. In this clamping system, the number of interfaces is dramatically reduced compared to other clamping systems or drill chucks known from the prior art, so that it increases the concentricity accuracy of the tool to be clamped. Due to the rotary transmission of the balls as well as the tool to be clamped, however, inaccuracies still exist with respect to the concentricity of the tool accommodated in the tool receptacle.

SUMMARY OF THE INVENTION

It is therefore an object of the present invention to provide a precision clamping system such that the rotation of the machine spindle is transmitted directly to the tool. The object of the present invention is furthermore to provide a combination of a drilling machine with a precision clamping system and a system comprising a precision clamping system, with the aid of which inaccuracies in concentricity are largely eliminated.

The object related to the precision clamping system is achieved in a precision clamping system in that the connecting piece is designed in such a way that a form-fitting connection with the machine spindle is established for the purpose of positive rotary entrainment of the chuck body, the collet receptacle has a conical design, and the collet is assigned a collet thread which may be screwed to a thread formed on the second end of the chuck body.

This is associated with the advantage that different collets may be accommodated in the collet receptacle, which vary with respect to the diameter of their tool receptacle for the purpose of accommodating tools of different sizes, i.e., drills, screwdrivers, etc. At the same time, a concentricity accuracy of the clamped tool amounting to 0.07 mm and less may be achieved thereby. The precision chuck according to the invention is formed without any clamping jaws—which are normally provided—nor with a threaded ring or a clamping sleeve which is rotatably fixedly coupled with the threaded ring. The chuck body is furthermore directly connectable to the machine spindle and molded to form a single piece in such a way that its rotational movement is also transmitted directly to the collet, which is disposed in the collet receptacle and into which the tool may be clamped. Due to the conical collet receptacle, it is ensured that a collet having a cone abuts the collet receptacle on all sides, and a pull down of the collet and a clamping of the tool shaft takes placed when the thread is screwed to the collet thread. It is furthermore ensured that the connecting piece establishes a form-fitting connection to the machine spindle, preferably forming an alignment therewith. A play-reduced or play-free coupling of the chuck body to the machine spindle is implemented hereby. Unlike the design known from the aforementioned DE 1 735 423 U, the invention does not provide a cone on the side facing the machine spindle, which may result in a decentralized orientation of the chuck body when the clamping chuck is mounted on the machine spindle.

It has proven to be useful if the thread is formed radially on the inside of the collet receptacle, and if the collet thread is formed on the outer circumference of the collet. This is associated with the advantage that the collet does not project over the second end of the chuck body, and the second end of the chuck body may therefore be provided with a narrow shape. When the collet chuck thread is screwed into the thread of the collet receptacle, this results in a pull down of the collet into the collet receptacle.

In this connection, it has furthermore proven to be advantageous if a clamping collar is formed on the collet for accommodating a clamping tool. The relevant collet may thus be screwed into the collet receptacle with greater lever force, so that the rotational movement of the machine spindle may be transmitted even more directly to the drilling tool and an even greater concentricity accuracy is provided thereby.

An embodiment is characterized in that the thread is formed radially on the outside of the collet receptacle, and the radially internal collet thread is formed on a cap nut assigned to the collet. Due to the use of a cap nut on the collet, it is possible to provide the precision clamping system with a shorter design in its axial direction, compared to the variant mentioned above having a collet with an outer thread. Another specific embodiment provides for the fact that the same cap nut is used for different collets having different tool receptacle diameters.

To enable the rotational movement of the machine spindle to be transmitted to the clamped tool preferably without play, it has furthermore proven to be useful if clamping structures are formed on the cap nut for the purpose of receiving a clamping tool. In this way, the collet thread of the cap nut assigned to the collet may be screwed into the thread of the second end of the chuck body with greater lever forces.

In an embodiment, it is provided that a driving pin having a non-round cross section is provided in the connecting piece. The driving pin may be shaped to form a single piece with the chuck body or be introduced without play into a pocket in the chuck body. The driving pin is preferably designed as a polygon, in particular as a hexagon.

To establish an even more rotatably fixed connection to the machine spindle, it has proven to be advantageous according to another preferred specific embodiment if detents are disposed in the connecting piece, distributed over the circumference.

To allow these detents to engage and disengage, it has been shown to be advantageous if a preferably manually actuatable locking ring is disposed on the first end of the chuck body, by means of which the detents are adjustable between an engaged position, which locks the machine spindle, and a disengaged position, which releases the machine spindle.

The object relating to the combination of a drilling machine and a precision clamping system is achieved by the features according to claim 9. The drilling machine is preferably designed as a pneumatic screwdriver.

An embodiment of a combination is characterized in that detents, which are distributed over the circumference, are disposed in the connecting piece of the chuck body, an actuatable locking ring is disposed on the first end of the chuck body, by means of which the detents are adjustable between an engaged position, which locks the machine spindle, and a disengaged position, which releases the machine spindle, and the machine spindle has at least one detent receptacle for accommodating at least one of the detents disposed in the connecting piece. This is associated with the advantage that detent receptacles are formed in the machine spindle, with which the detents assigned to the chuck body may engage and disengage, thereby establishing a form-fitting connection without play between the machine spindle and the connecting piece of the precision clamping system. The detents are thus the elements establishing the form fit or the positive rotary entrainment between the precision clamping system and the machine spindle of the drilling machine.

An embodiment of a combination is characterized in that a driving pin having a non-round cross section as well as detents, which are distributed over the circumference, are disposed in the connecting piece of the chuck body, an actuatable locking ring is disposed on the first end of the chuck body, by means of which the detents are adjustable between an engaged position, which locks the machine spindle, and a disengaged position, which releases the machine spindle, and the machine spindle comprises at least one detent receptacle having a radial cam as well as a pin receptacle having a non-round cross section, which is disposed on the end face. Due to a radial cam of this type, it is possible to achieve that the connecting piece is pulled into a predefined position by the detents; in other words, a pull down, preferably a planar pull down to the machine spindle, takes place. In this case, the relevant detents additionally perform the function of a detent which interacts with the radial cam. The positive rotary entrainment of the chuck body by the machine spindle takes place, preferably without play, by the driving pin engaging with the pin receptacle of the machine spindle. For this purpose, the driving pin preferably has a cross section which corresponds with a cross section of the pin receptacle.

The object relating to the system is associated with the advantage that different tools, such as drilling tool, bits, screwdrivers, etc., may be inserted into the collets using tool receptacles of different diameters. As a result, the system has versatile and multifunctional uses. The collets may be interchangeably inserted into the collet receptacles.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
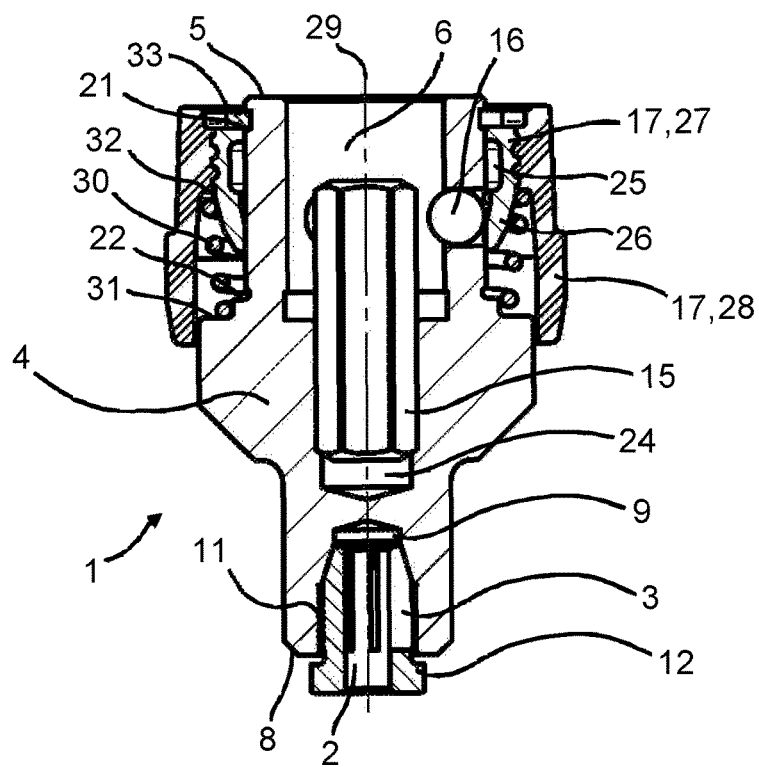
FIG. 1 shows an embodiment of a precision clamping system.
Figure 3:
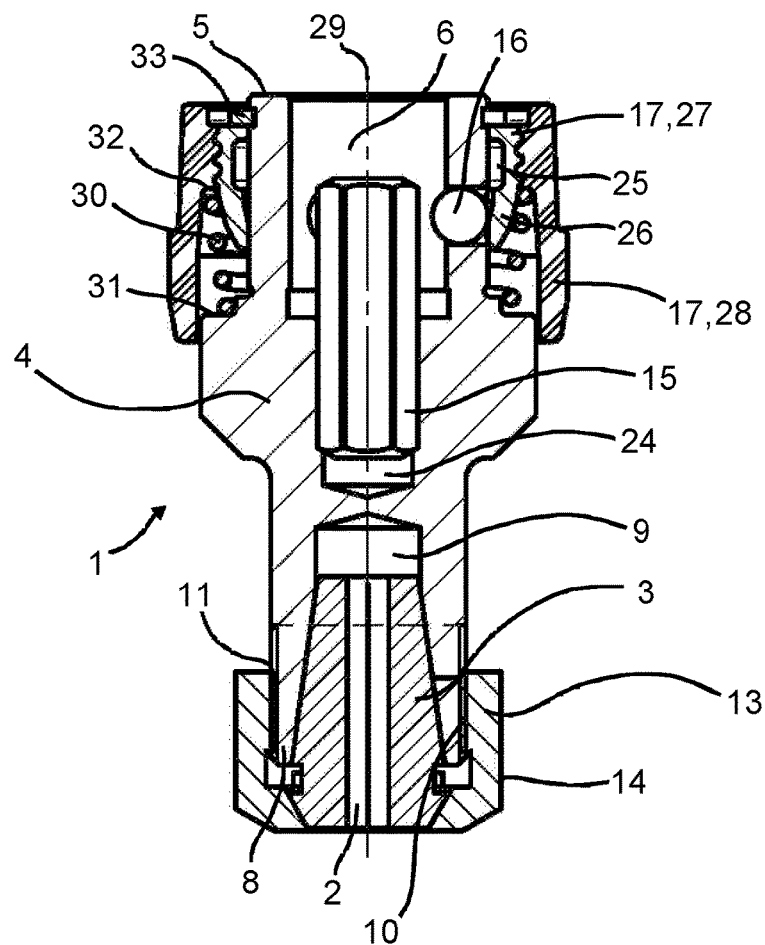
FIG. 3 shows an embodiment of a precision clamping system.
Figure 4:
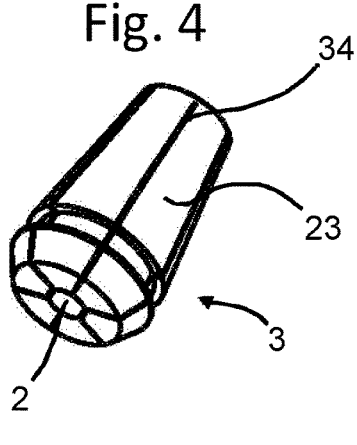
FIG. 4 shows the collet of the precision clamping system according to FIG. 3, without a cap nut.
Figure 6:
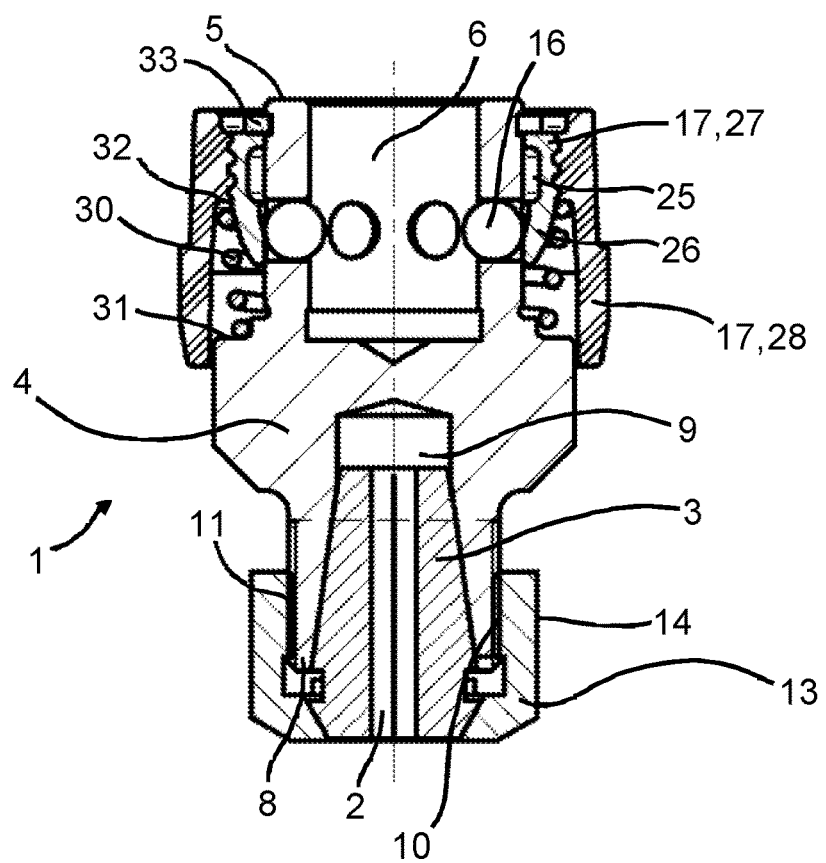
FIG. 6 shows an embodiment of a precision clamping system.

A precision clamping system 1, which includes a chuck body 4 formed from a single piece, is illustrated in FIGS. 1, 3 and 6. A connecting piece 6 is formed on a first end 5 of chuck body 4, which is directly connectable to a machine spindle 7 of a drilling machine. A collet receptacle 9 for receiving a collet 3 having a tool receptacle 2 is formed on second end 8 facing away from first end 5. Connecting piece 6 is designed for the positive rotary entrainment of chuck body 4 by machine spindle 7 in such a way that connecting piece 6 forms a form-fitting connection with machine spindle 7. Collet receptacle 9 of chuck body 4 has a conical shape, and second end 8 of chuck body 4 has a thread 11, which may be screwed to a collet thread 10 of a collet 3.

Figure 2:
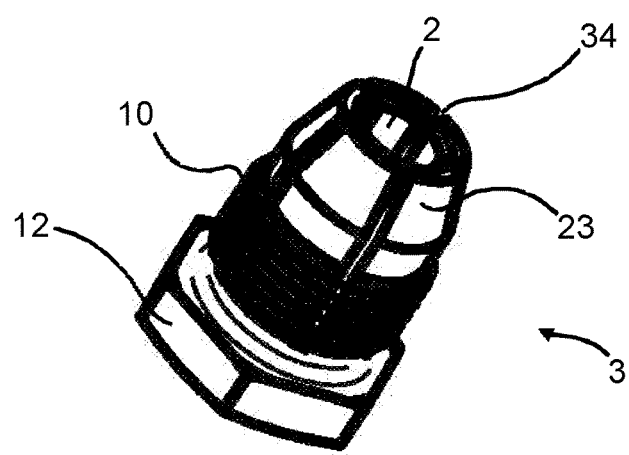
FIG. 2 shows the collet of the precision clamping system according to FIG. 1.

In the exemplary embodiment according to FIG. 1, thread 11 is formed radially on the inside of collet receptacle 9. A collet 3, in particular a collet 3 according to FIG. 2, is inserted into this thread 11. This collet 3 includes a clamping cone 23 as well as a collet thread 10 situated radially on the outside. Collet thread 10 may be screwed into the inner thread of collet receptacle 9 of chuck body 4. For this purpose, collet 3 has a clamping collar 12 which is used as a wrench receptacle for a (polygonal) wrench, preferably for a hexagon wrench. Collet 3 furthermore includes a tool receptacle 2, into which a tool is insertable. When collet 3 is screwed into collet receptacle 9 of chuck body 4, cone 23—which is formed with slots 34 oriented in the longitudinal direction—is pressed in the direction of central longitudinal axis 29 by the conical shape of the collet receptacle, whereby the accommodated tool is clamped within collet 3. Collet thread 10 and thread 11 thus provide a pull down for collet 3 into collet receptacle 9.

In the exemplary embodiments according to FIGS. 3 and 6, a cap nut 13 is assigned to the collet 3 illustrated therein. Cap nut 13 is also actuatable via corresponding clamping structures 14, with the aid of a clamping tool. Collet thread 10 is formed on cap nut 13 in the form of an inner thread, which is screwed to a thread 11 of second end 8 of chuck body 4. In this case as well, cone 23 of collet 3 is pressed by conical collet receptacle 9, and a pull down for collet 3 is provided.

In all exemplary embodiments shown, detents 16 are disposed in connecting piece 6, distributed over the circumference. In the present case, detents 16 are in the form of locking balls, which are able to engage with corresponding structures in a machine spindle 7. A total of exactly three of detents 16 are provided in the exemplary embodiments according to FIGS. 1 and 3, and a total of precisely six thereof are provided in the exemplary embodiment according to FIG. 6, it being possible in this case as well to use more or fewer detents 16, for example two or eight locking balls. According to one alternative specific embodiment, it is also provided that detents 16 are in the form of locking bolts, which may engage with corresponding bolt receptacles on machine spindle 7.

A preferably manually actuatable locking ring 17 is disposed on first end 5 of chuck body 4, by means of which detents 16 are adjustable between an engaged position, which locks machine spindle 7, and a disengaged position, which releases machine spindle 7. As is furthermore apparent from FIGS. 1, 3 and 6, locking ring 17 is preferably formed in multiple parts from a locking sleeve 27 and an actuating sleeve 28. In the unlocked position, which releases machine spindle 7, detents 16 are accommodated in corresponding recesses 25 of locking sleeve 27. When locking ring 17 is adjusted axially to the back, i.e., in the direction of machine spindle 7, detents 16 slide out of recesses 25, and pressure elements 26 formed in locking sleeve 27, preferably having a spring-mounted design, press detents 16 into the engaged position, which locks machine spindle 7. To hold locking ring 17, and thus detents 16, in a position which locks machine spindle 7, a spring element 30 is provided, which is supported on one end on a shoulder 31 of chuck body 4 and on the other end on a shoulder 32 of locking ring 17. Spring element 30, which is designed as a spiral spring, thus continuously presses locking ring 17 axially toward the back to move it into the locked position. A stop ring 33 is furthermore disposed axially toward the back, i.e., on the side of connecting piece 6 facing machine spindle 7, which supports locking ring 17 toward the back and thereby secures it on chuck body 4 formed from a single part.

Figure 5:
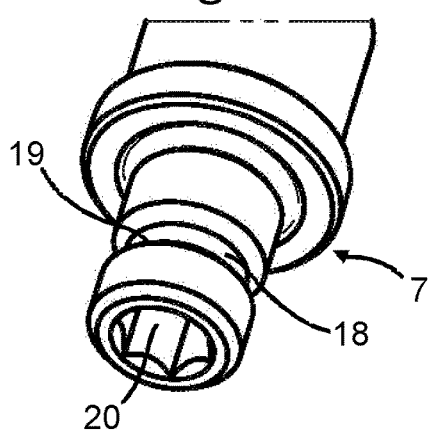
FIG. 5 shows a detail of a machine spindle of a drilling machine for use in one of the precision clamping systems according to FIG. 1 or FIG. 3.
Figure 7:
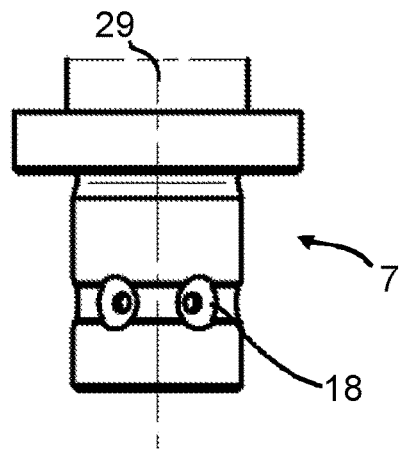
FIG. 7 shows a detail of a machine spindle of a drilling machine for use in the precision clamping system according to FIG. 6.

In connecting pieces 6 of specific embodiments according to FIGS. 1 and 3, a driving pin 15 is rotatably fixedly disposed in chuck body 4. This driving pin 15 may be inserted into a pin receptacle 20 of a machine spindle 7, preferably without play (FIG. 5). This ensures that the rotational movement of machine spindle 7 is directly transmitted to chuck body 4 formed from a single part via driving pin 15, preferably without play. Alternatively, it is also provided that connecting piece 6 itself is designed with a non-round cross section, with which a machine spindle 7 having a corresponding cross section may engage for the purpose of establishing a positive entrainment.

Machine spindle 7 according to FIG. 5 furthermore has a detent receptacle 18 designed as an annular groove, which comprises the one radial cam 19. The radial cam is formed on the groove flank of this annular groove facing precision clamping system 1. This radial cam 19 is designed in such a way that it provides a pull down for chuck body 4, whereby precision clamping system 1 is designed to permit—even—more tight coupling to machine spindle 7.

Conversely, connecting piece 6 of the specific embodiment according to FIG. 6 does not have a driving pin 15 in chuck body 4. However, a set of detent receptacles 18 on machine spindle 7 is provided with a dome-shaped design. In the locked position, detents 16, which are designed as locking balls, are accommodated in these dome-shaped detent receptacles 18 in a form-fitting manner, whereby a form-fitting connection is established between machine spindle 7 and chuck body 4. A positive rotary entrainment between machine spindle 7 and chuck body 4 is thus facilitated with the aid of the locking balls and the dome-shaped receptacles even without a driving pin 15. Instead of a dome shape, a bolt receptacle may also be provided, into which a detent 16 designed as a locking bolt may be inserted.

In all specific embodiments illustrated or described, a precision clamping system 1 is ultimately provided, which is formed by only a very small number of interfaces. It transmits the rotational movement of machine spindle 7 to the drilling tool with almost no interfaces, whereby concentricity errors of 0.07 mm or less are achieved. The axial length of precision clamping system 1 is preferably between 40 mm and 50 mm, so that precision clamping system 1 may have a very compact design.

Collets 3 may additionally be interchangeably accommodated in collet receptacle 9, so that collets 3 having tool receptacles 2 of different diameters may also be used into the same chuck body 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A precision clamping system comprising:
a collet having a tool receptacle; and
a chuck body formed from a single part on whose first end a connecting piece is formed, which is directly connectable to a machine spindle of a drilling machine, and on whose second end facing away from the first end a collet receptacle is formed for receiving the collet,
wherein the connecting piece is designed such that a form-fitting connection to the machine spindle is established for a positive rotary entrainment of the chuck body,
wherein the collet receptacle has a conical design,
wherein the collet is assigned a collet thread, which is screwed to a thread formed on the second end of the chuck body, and
wherein detents are arranged in the connecting piece and distributed over the circumference of the connecting piece, the detents interacting with the machine spindle to provide the form-fitting connection.

2. The precision clamping system according to claim 1, wherein the thread is formed radially on an inside of the collet receptacle, and wherein the collet thread is formed on an outer circumference of the collet.

3. The precision clamping system according to claim 1, wherein a clamping collar is formed on the collet for accommodating a clamping tool.

4. The precision clamping system according to claim 1, wherein the thread is formed radially on the outside of the collet receptacle, and wherein the collet thread is situated radially on the inside of a cap nut assigned to the collet.

5. The precision clamping system according to claim 4, wherein clamping structures are formed on the cap nut for receiving a clamping tool.

6. The precision clamping system according to claim 1, wherein a driving pin having a non-round cross section is provided in the connecting piece.

7. The precision clamping system according to claim 1, wherein an actuatable locking ring is arranged on the first end of the chuck body, via which the detents are adjustable between an engaged position, which locks the machine spindle, and a disengaged position, which releases the machine spindle.

8. A combination of a drilling machine, which includes a machine spindle, and a precision clamping system according to claim 1.

9. The combination according to claim 8, wherein an actuatable locking ring is arranged on the first end of the chuck body via which the detents are adjustable between an engaged position, which locks the machine spindle, and a disengaged position, which releases the machine spindle, and wherein the machine spindle has at least one detent receptacle for accommodating at least one of the detents arranged in the connecting piece.

10. The combination according to claim 8, wherein a driving pin having a non-round cross section is arranged in the connecting piece of the chuck body, wherein an actuatable locking ring is arranged on the first end of the chuck body, via which the detents are adjustable between an engaged position, which locks the machine spindle, and a disengaged position, which releases the machine spindle, and wherein the machine spindle comprises at least one detent receptacle having a radial cam and a pin receptacle having a non-round cross section, which is disposed on an end face thereof.

11. The combination according to claim 10, wherein the at least one detent receptacle is an annular groove that extends continuously around the circumference of the machine spindle.

12. A system comprising a precision clamping system according to claim 1, comprising a set of collets, which are interchangeably disposable in the collet receptacle and which have tool receptacles of different diameters.

13. The precision clamping system according to claim 1, wherein the detents directly interact with the machine spindle to provide the form-fitting connection.

* * * * *